O. H. NEIMAN.
LUBRICATOR.
APPLICATION FILED MAY 8, 1914.
1,137,274.
Patented Apr. 27, 1915.
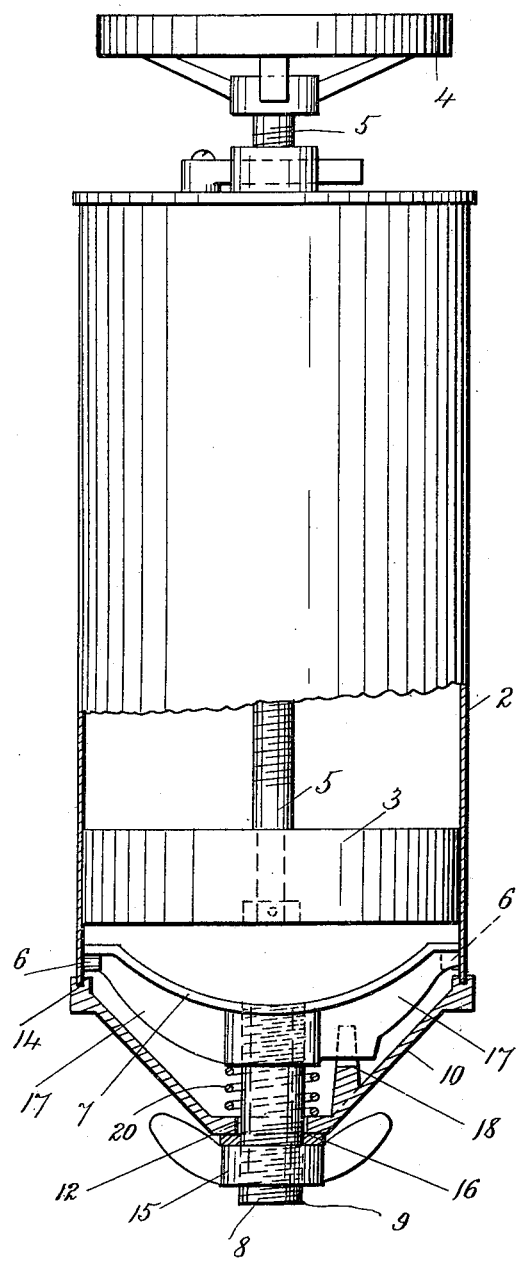
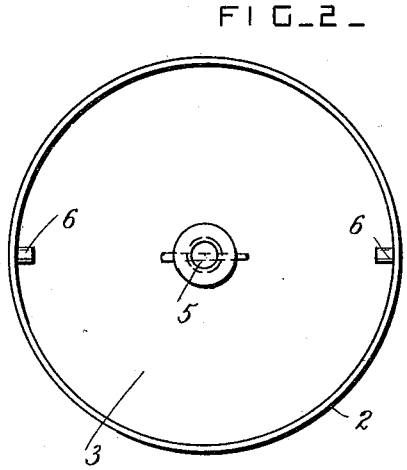
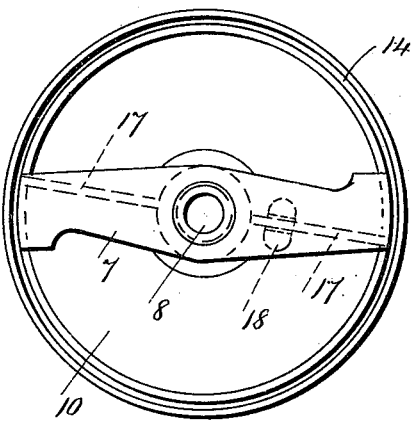
Witnesses
Wm N. Bates
W. Allen
Inventor
Oscar H. Neiman
By Herbert W. Jenner.
Attorney

UNITED STATES PATENT OFFICE.

OSCAR HERMAN NEIMAN, OF FREEPORT, ILLINOIS.

LUBRICATOR.

1,137,274.  Specification of Letters Patent.  Patented Apr. 27, 1915.

Application filed May 8, 1914. Serial No. 837,320.

*To all whom it may concern:*

Be it known that I, OSCAR H. NEIMAN, a citizen of the United States, residing at Freeport, in the county of Stephenson and State of Illinois, have invented certain new and useful Improvements in Lubricators; and I do hereby declare the following to be a full, clear, and exact description of the invention, such as will enable others skilled in the art to which it appertains to make and use the same.

This invention relates to force feed lubricators for grease, of the kind shown in the Patent No. 984,839, issued to me on February 21, 1911; and it consists in certain improvements to the removable cover and outlet pipe as hereinafter fully described and claimed.

In the drawings, Figure 1 is a side view of a lubricator constructed according to this invention, showing its lower portion in section. Fig. 2 is a plan view, from below, with the cover removed. Fig. 3 is a plan view of the cover, from above.

The body portion 2 of the lubricator is a cylinder for holding grease or other similar lubricating material, and it has a piston 3 which is slidable vertically in it. The piston is forced downwardly by means of a hand-wheel 4 and a piston-rod 5, the construction of these parts being preferably as shown in the aforesaid patent, but any other approved means may be used for forcing out the lubricant from the cylinder.

The bottom end portion of the cylinder has two inwardly projecting lugs or pins 6, and 7 is a bridge-piece or crossbar the end portions of which are slipped into engagement with the said lugs. The outlet pipe 8 for the grease is secured to the middle part of the bridge-piece, and it has a screwthreaded portion 9.

The cover 10 is conical in form, and it has a central hole 12 through which the outlet pipe is arranged to project. The periphery of the cover has a groove 14, or other approved means, for making a grease-tight joint with the bottom end of the cylinder.

A nut 15, which is preferably a wing-nut or thumb-nut, is screwed on the projecting screwthreaded portion of the pipe 8, and it secures the cover in place, a packing washer 16 being interposed between the nut and the cover.

The crossbar or bridge-piece has ribs 17 on it which bear on the lugs 6 and prevent it from revolving in one direction, and the cover has a forked guide jaw 18 which projects upwardly and engages with one of the ribs 17. A helical spring 20 is arranged around the outlet pipe between the cover and the middle portion of the bridge-piece, so that the cover and crossbar are held relatively in place by spring pressure before the nut is tightened. This spring also releases the bridge-piece or crossbar from the lugs when the nut is unscrewed. The guide jaw 18 enables the crossbar or bridge-piece to be arranged in engagement with the lugs, by placing it in the cylinder and moving the cover circumferentially until the engagement is effected. The spring 20 holds the crossbar at a suitable distance away from the cover, before the nut is screwed up, so that the end portions of the crossbar may be slipped behind or under the pins 6. The tighening of the nut then forces the groove of the cover over the bottom end of the cylinder, and completes the engagement of the crossbar with the pins.

The cover can be removed and replaced with facility as often as required to fill the cylinder with grease, and the construction of the parts is such as to form a very effective closure for the outlet end of the lubricator.

What I claim is:

1. In a lubricator, the combination, with a cylinder provided with projections at its lower end portion, and means for ejecting the lubricating material from the cylinder; of a crossbar which engages with the said projections and which has an outlet pipe at its middle part, a cover closing the outlet end of the cylinder and having a hole for the outlet pipe to project through, and means for securing the cover on the outlet pipe.

2. In a lubricator, the combination, with a cylinder provided with projections at its lower end portion, and means for ejecting the lubricating material from the cylinder; of a crossbar which engages with the said projections and which has an outlet pipe at its middle part, a cover closing the outlet end of the cylinder and having a hole for the outlet pipe to project through, a helical spring encircling the outlet pipe and arranged between the cover and the crossbar, and means for securing the cover on the outlet pipe.

3. In a lubricator, the combination, with a cylinder provided with projections at its lower end portion, and means for ejecting the lubricating material from the cylinder; of a crossbar which engages with the said projections and which has an outlet pipe at its middle part, a cover closing the outlet end of the cylinder and having a hole for the outlet pipe to project through, a guide portion projecting from the cover and engaging slidably with the crossbar, and means for securing the cover on the outlet pipe.

In testimony whereof I have affixed my signature in the presence of two witnesses.

OSCAR HERMAN NEIMAN.

Witnesses:
H. H. DEERY,
I. K. SNYDER.

Copies of this patent may be obtained for five cents each, by addressing the "Commissioner of Patents, Washington, D. C."